US012452703B2

(12) United States Patent
Wen et al.

(10) Patent No.: US 12,452,703 B2
(45) Date of Patent: Oct. 21, 2025

(54) METHOD FOR SIGNAL OPTIMIZATION BETWEEN USER EQUIPMENT AND RECONFIGURABLE INTELLIGENCE SURFACE

(71) Applicant: NATIONAL SUN YAT-SEN UNIVERSITY, Kaohsiung (TW)

(72) Inventors: Chao-Kai Wen, Kaohsiung (TW);
Feng-Ji Chen, Kaohsiung (TW);
Tzu-Hao Huang, Kaohsiung (TW);
De-Ming Chian, Kaohsiung (TW);
Chuan-Yuan Wang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 350 days.

(21) Appl. No.: 18/143,704

(22) Filed: May 5, 2023

(65) Prior Publication Data
US 2024/0276240 A1 Aug. 15, 2024

(30) Foreign Application Priority Data

Feb. 10, 2023 (TW) ................. 112104829

(51) Int. Cl.
H04W 24/00 (2009.01)
H04L 43/065 (2022.01)
H04W 24/02 (2009.01)

(52) U.S. Cl.
CPC ........... H04W 24/02 (2013.01); H04L 43/065 (2013.01)

(58) Field of Classification Search
CPC ...................... H04W 24/02; H04L 43/065
See application file for complete search history.

(56) References Cited

FOREIGN PATENT DOCUMENTS

| CN | 114390630 A | * | 4/2022 | ............ H04W 40/10 |
| CN | 115334526 A | * | 11/2022 | ............ H04B 7/145 |

* cited by examiner

Primary Examiner — Erika A Washington
(74) Attorney, Agent, or Firm — WPAT, PC

(57) ABSTRACT

A method for signal optimization between a user equipment and a reconfigurable intelligence surface includes a phase optimization step having: generating at least one modified phase combination in the state that a performance index of a current phase combination is smaller than a preset performance threshold value; evaluating whether a corresponding performance index of the modified phase combination is not smaller than the preset performance threshold value or evaluating whether the performance index of the modified phase combination is larger than the corresponding performance index of the current phase combination, to determine an optimized phase combination, enabling a corresponding performance index to be not smaller than the preset performance threshold value or not smaller than the performance index of any modified phase combination in the phase optimization step; and replacing the current phase combination by the optimized phase combination to form an updated current phase combination.

12 Claims, 4 Drawing Sheets

METHOD FOR SIGNAL OPTIMIZATION BETWEEN USER EQUIPMENT AND RECONFIGURABLE INTELLIGENCE SURFACE

CROSS REFERENCE TO RELATED APPLICATION

The application claims the benefit of Taiwan application serial No. 112104829, filed on Feb. 10, 2023, and the entire contents of which are incorporated herein by reference.

BACKGROUND OF THE INVENTION

1. Field of the Invention

The present invention relates to a signal optimization method and, more particularly, to a method for signal optimization between user equipment and a reconfigurable intelligence surface.

2. Description of the Related Art

Since the fourth generation and fifth generation of mobile communication technologies (4G, 5G) utilize a Multi-Input Multi-Output (MIMO) system to improve the spectral performance, the sixth generation of mobile communication system (6G) is extremely likely to be developed towards a larger-scale MIMO system in the future. Enough channels are needed for carrying signals when the MIMO system is configured in user-equipment/end-equipment/end-user, and the larger the scale of the MIMO system is, the more the needed channels are. Therefore, a reconfigurable intelligent surface (RIS) is utilized to provide an additional signal path for the communication system to effectively improve the system capacity and signal coverage.

The RIS is mainly composed of a plurality of antennas, a phase shifter and a controller. Most of the elements are passive elements, and the electromagnetic characteristics of signals can be controlled by modifying the phase. Moreover, the RIS has the characteristics of low cost, low energy consumption and high design flexibility. In order to effectively provide an additional signal path for a user, it is needed to appropriately and instantly adjust the phase of the RIS according to the condition of the user.

However, the known mainstream regulation and control mechanism of the RIS is carried out by a "signal channel analysis method" at present. In the signal channel analysis method, a terminal performs channel estimation to estimate multiple channels, and then a corresponding RIS phase combination is derived from the channel estimation result by using a calculation method. Because the direction of arrival of the RIS needs to be considered, the physical position of a base station needs to be additionally considered, extra communication cost is increased, and complicated mathematical calculation also needs to be carried out.

In light of the above, it is necessary to improve the conventional signal optimization method.

SUMMARY OF THE INVENTION

In order to solve the problem above, it is an objective of the present invention to provide a method for signal optimization between user equipment and a reconfigurable intelligence surface to improve the operational performance or reduce the hardware demand.

It is another objective of the present invention to provide a method for signal optimization between user equipment and a reconfigurable intelligence surface to enable the user equipment to maintain better signal quality.

It is yet another objective of the present invention to provide a method for signal optimization between user equipment and a reconfigurable intelligence surface to improve the overall optimization performance.

As used herein, the term "one", "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling" mentioned in the full text of the present invention includes the direct or indirect connection of electrical and/or signal, which can be selected by one having ordinary skill in the art according to the actual needs.

As used herein, the term "controller" and "user equipment" described in the full text of the present disclosure can each contain at least one "processor". The processor refers to various data processing apparatuses with specific functions and implemented in hardware or hardware and software, which are configured to process analysis information and/or generate corresponding control information, such as electronic controller, server, cloud platform, virtual machine, desktop computer, notebook computer, tablet computer or smart phones, belong to the technical field of the present disclosure, which can be understood by those with basic knowledge. In addition, a corresponding data receiving or transmission unit can be included to receive or transmit the required data. In addition, it can contain the corresponding database/storage unit to store the required data. In particular, unless otherwise specifically excluded or contradicted, the processor can be a collection of multiple processors based on the distributed system architecture, which contains/represents the process, mechanism and results of information stream processing among the multiple processors.

The mechanism of mutual transmission and/or reception of signals between various elements such as "base station", "reconfigurable intelligence surface", "controller", "reflecting unit", "user equipment", "performance evaluation module" and "decision control module" described in the full text of the present disclosure is based on the corresponding hardware and matching software system between the elements to realize the configuration of Internet of Things. These technologies are understandable to one having ordinary skill in the art.

According to the method for signal optimization between the user equipment and the reconfigurable intelligence surface of the present invention, the reconfigurable intelligence surface is coupled with the user equipment through a plurality of reflecting units of the reconfigurable intelligence surface, and each reflecting unit has a plurality of phases. The method is provided with a preset performance threshold value. The method includes a phase combination optimization process, which includes a current performance generation step, a current performance evaluating step, a real optimum phase combination determining step, and a phase optimization step. The current performance generation step includes: generating an RIS signal by the reconfigurable intelligence surface according to a current phase combination formed by a current phase of each reflecting unit, receiving the RIS signal by the user equipment, and generating a corresponding performance indicator by a performance evaluation module according to the RIS signal. The current performance evaluating step includes: evaluating whether the performance indicator corresponding to the current phase combination is not less than the preset performance threshold value, and continuing to perform a real optimum phase combination determining step or a phase optimization step according to an evaluation result. The real optimum phase combination determining step includes: reflecting the corresponding RIS signal by the reconfigurable intelligence surface through the current phase combination to form coupling with the user equipment in a state that the performance indicator is not less than the preset performance threshold value. The phase optimization step includes: generating at least one modified phase combination corresponding to an applied phase modifying method based on the current phase combination in a state that the performance indicator of the current phase combination is less than the preset performance threshold value, enabling the combination formed by the phase of each reflecting unit in the current phase combination to be different from the modified phase combination, and evaluating whether a performance indicator corresponding to the modified phase combination is not less than the preset performance threshold value; defining the modified phase combination to be an optimized phase combination when the performance indicator corresponding to the modified phase combination is not less than the preset performance threshold value; evaluating whether the performance indicator corresponding to the modified phase combination is greater than the corresponding performance indicator of the current phase combination when the performance indicator corresponding to the modified phase combination is less than the preset performance threshold value so as to determine an optimized phase combination; and then replacing the optimized phase combination with the current phase combination to become an updated current phase combination. Wherein, by means of said phase optimization step, the performance indicator of the optimized phase combination is ensured not less than the preset performance threshold value or not inferior to the performance indicator of all of the at least one modified phase combination.

Therefore, according to the method for signal optimization between the user equipment and the reconfigurable intelligence surface of the present invention, the performance indicator of the optimized phase combination is not less than the preset performance threshold value or not inferior to the performance indicator of all previous modified phase combinations, and the optimized phase combination replaces the current phase combination to become the updated current phase combination, so that the user equipment and the reconfigurable intelligence surface are ensured to be coupled in the means having better signal quality. As a result, the effect of enabling the user equipment to have better signal quality is achieved.

In an example, the method for signal optimization further includes a continuous monitoring process following the phase combination optimization process. The continuous monitoring process includes a monitoring evaluating step of determining whether a restart optimization condition is met based on the current phase combination obtained after performing the phase combination optimization process each time; repeating the current performance evaluating step in a state that the restart optimization condition is met; and repeating the monitoring evaluating step in a state that the restart optimization condition is not met. Thus, the current phase combination allocated to the user equipment by the reconfigurable intelligence surface can be continuously updated/adjusted through the continuous monitoring process, so that the user equipment can continuously operate in a state with a relatively good performance indicator, and the effect of enabling the user equipment to have good signal quality is achieved.

In an example, the phase modifying method adopted in the phase optimization step is a neighboring phase adjusting method. According to the neighboring phase adjusting method, the at least one modified phase combination is formed by using a neighboring phase defined in an adjacent interval of a reference phase defined by a current phase of each of the reflecting units corresponding to the current phase combination, corresponding phase modifying is performed on only one of the reflecting units each time, and each time a new modified phase combination is formed, an evaluation is performed to check whether the performance indicator corresponding to the modified phase combination is not less than the preset performance threshold value and/or whether the performance indicator corresponding to the modified phase combination is greater than the performance indicator corresponding to the current phase; wherein, if the modified phase combination formed by any of the neighboring phases is not less than the preset performance threshold or greater than the performance indicator corresponding to the current phase, the modified phase combination replaces the current phase combination to become the updated current phase combination; at this situation, for the current one reflecting unit, if there are other neighboring phases within said adjacent interval having not been formed the modified phase combinations, no new modified phase combinations are formed according to the other neighboring phases; wherein, if the modified phase combination is not less than the preset performance threshold, the phase optimization step is ended; otherwise if all of the at least one modified phase combination are less than the preset performance threshold, the phase optimization step is ended. Thus, through the modifying mechanism of the neighboring phase adjusting method, especially in the situation that the modified phase combination replaces the current phase combination to become the updated current phase combination (where no new modified phase combinations will be formed according to the other neighboring phases within said adjacent interval having not been formed the modified phase combinations), the number of calculations in an optimization process is reduced, and hence to achieve the effect of improving the overall optimization efficiency.

In an example, the phase modifying method adopted in the phase optimization step is the neighboring phase adjusting method. The neighboring phase adjusting method includes the following steps: a to-be-adjusted reflecting unit determining step, a neighboring phase adjusting step, and an adjusted performance evaluating step. The to-be-adjusted reflecting unit determining step includes: determining a reflecting unit which has not been adjusted for the current phase combination in the same process of the phase combination optimization process as a to-be-adjusted reflecting unit. The neighboring phase adjusting step includes: every time to generate a new modified phase combination, adjusting one phase of the to-be-adjusted reflecting unit to be one of at least one neighboring phase having not been formed a modified phase combination, wherein said at least one neighboring phase is defined within an adjacent interval of a reference phase of the to-be-adjusted reflecting unit. The adjusted performance evaluating step includes: evaluating whether the performance indicator corresponding to the modified phase combination is not less than the preset performance threshold value and/or is greater than the performance indicator corresponding to the current phase combination, and providing a first comparison pattern, a second comparison pattern, and a third comparison pattern. The first comparison pattern includes: replacing the current phase combination with the modified phase combination to form an updated current phase combination when the performance indicator of the modified phase combination is not less than the preset performance threshold value, and ending the phase optimization step. The second comparison pattern includes: replacing the current phase combination with the modified phase combination to form an updated current phase combination when the performance indicator of the modified phase combination is less than the preset performance threshold value but greater than the performance indicator of the current phase combination; then, ending adjusting the phase of the to-be-adjusted reflecting unit, and continuing to perform an ending-modifying determining step. The third comparison pattern includes: confirming whether each of the at least one neighboring phase corresponding to the to-be-adjusted reflecting unit has been formed the modified phase combination when the performance indicator of the modified phase combination is less than the preset performance threshold value and not greater than the performance indicator of the current phase; if there is any one of the at least one neighboring phase having not been formed a non-modified phase combination, repeating the neighboring phase adjusting step; if each of the at least one neighboring phase has been formed a respective one modified phase combination, continuing to perform the ending-modifying determining step. The ending-modifying determining step includes: confirming whether there is any reflecting unit having not been adjusted in the same process of the phase combination optimization process; if there is any reflecting unit having not been adjusted, repeating the to-be-adjusted reflecting unit determining step; and if all reflecting units have been adjusted, ending the phase optimization step to obtain the current optimal phase combination. Thus, through the modifying mechanism of the neighboring phase adjusting method, the number of calculations in the optimization process can be reduced, and hence to achieve the effect of improving the overall optimization efficiency.

In an example, in the continuous monitoring process, in a state that the current performance evaluating step is repeated and the corresponding phase optimization step is performed, the neighboring phase modifying is performed based on the above-mentioned neighboring phase adjusting method adopted in the phase optimization step. Thus, good signal quality can be maintained through the continuous monitoring process. In addition, the number of calculations in the optimization process can be reduced through the modifying mechanism of the neighboring phase adjusting method, and hence to achieve the effect of improving the overall optimization efficient.

In an example, the restart optimization condition includes an accumulated time condition and/or a variable distance condition and/or a performance indicator weakening condition; the accumulated time condition is defined to determine whether the accumulated execution time of the current phase combination is not less than a time threshold value; the variable distance condition is defined to determine whether a moving distance of the user equipment is not less than a distance threshold value; and the performance indicator weakening condition is defined to determine whether the performance indicator of the current phase combination at present is reduced over/beyond a specific difference value compared with the performance indicator of the current phase combination itself at a previous timing to be determined as the optimized phase combination. Thus, through the restart optimization conditions in the continuous monitoring process, the quality of signals received by the user equipment can be optimized at a proper time, and hence to achieve the effect of enabling the user equipment to maintain better signal quality.

In an example, the preset performance threshold value is defined as a numerical value formed by adding a specific difference value to a performance indicator of an initial phase combination. Thus, through the definition of the preset performance threshold value (corresponding to a second performance indicator below), and hence a reasonable threshold value range can be defined so as to make each optimization process meet the threshold value range more easily; therefore, an improved optimization result can be obtained in multiple optimization processes (especially in the earlier stages/iterations of multiple optimization processes), and the number of calculations in the optimization processes is reduced. As a result, the effect of improving the overall optimization efficiency can be achieved.

In an example, the preset performance threshold value includes a first performance threshold value and a second performance threshold value. The first performance threshold value is defined as a constant, and the second performance threshold value is defined as a numerical value formed by adding a specific difference value to a performance indicator of an initial phase combination; and in the phase optimization step, when the performance indicator corresponding to the modified phase combination is not less than any one of the first performance threshold value and the second performance threshold value, a corresponding determination condition that the performance indicator corresponding to the modified phase combination is not less than the preset performance threshold value is met. Thus, a reasonable threshold value range can be defined through the second performance threshold value so as to make each optimization process meet the threshold value range more easily; therefore, the improved optimization results (even if the performance indicator is less than the first performance threshold value) can be obtained in the multiple optimization processes (especially in earlier stages/iterations of the multiple optimization processes). Consequently, the number of calculations in the optimization process is reduced, and the effect of improving the overall optimization performance and efficiency can be achieved. In addition, through the first performance threshold value, in the optimization process (especially in the later stages/iterations of the multiple optimization processes), the performance indicator corresponding to the modified phase combination is used as an optimized phase combination when the performance indicator is not smaller than the first performance threshold value (even if the performance indicator is smaller than the second performance threshold value), so that the effect of improving the overall optimization performance and efficiency can be achieved.

In an example, the method for signal optimization further includes a decision control module. The decision control module is configured to receive the performance indicator generated by the user equipment corresponding to the current phase combination and/or the modified phase combination to perform a performance evaluation operation, generate an modifying instruction according to the phase modifying method, and transmit the modifying instruction to a controller of the reconfigurable intelligence surface; then the controller is configured to control the phase of the corresponding reflecting unit to be changed/adjusted according to the modifying instruction so as to generate the modified phase combination in the phase modifying method. Wherein, the performance evaluation operation includes the steps of evaluating whether the performance indicator of the current phase combination is not less than the preset performance threshold value, and/or evaluating whether the performance indicator of the modified phase combination is not less than the preset performance threshold value and/or greater than the performance indicator of the current phase combination.

In an example, in the neighboring phase adjusting step, a phase in the at least one neighboring phase, having not been formed a modified phase combination and having a smaller phase difference relative to the reference phase, is determined to have a higher priority for forming a modified phase combination. Thus, through a mechanism of taking the neighboring phase with the smaller phase difference having higher priority to be a modifying phase, especially under a corresponding restart optimization condition, the phase with an optimal or a better signal index has a higher probability of being distributed in the neighboring phase with the smaller phase difference, so that the number of calculations in the optimization process is reduced, and the effect of improving the overall optimization efficiency is achieved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
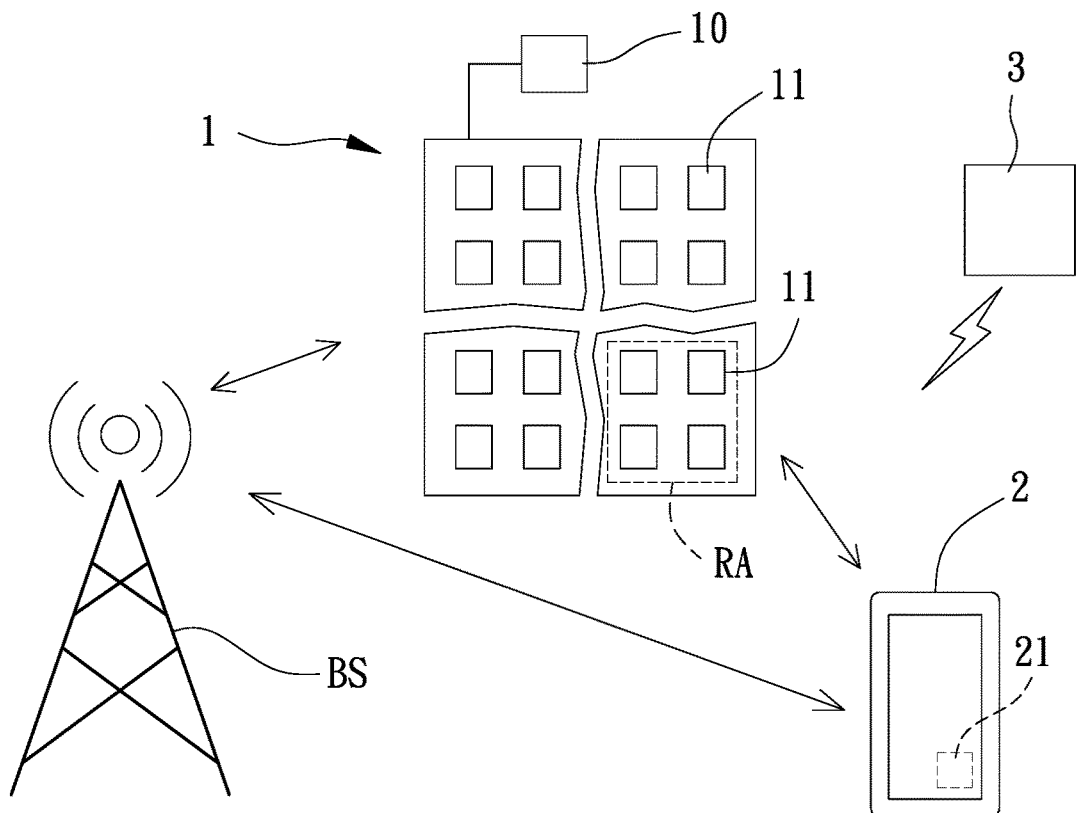
FIG. 1 is a schematic diagram of a communication network according to a preferred embodiment of the present invention.

FIG. 1 shows a preferred embodiment of a method for signal optimization between user equipment and a reconfigurable intelligence surface according to the present invention. The method includes the reconfigurable intelligence surface 1 and the user equipment 2. The reconfigurable intelligence surface 1 and the user equipment 2 are coupled through a signal, and more particularly, the reconfigurable intelligence surface 1 generates an RIS signal according to a signal from a base station BS so as to form a coupling relationship with the user equipment 2. In addition, the method optionally includes a decision control module 3 which is used as a communication medium for signal optimization between the reconfigurable intelligence surface 1 and the user equipment 2.

The reconfigurable intelligence surface 1 is provided with a controller 10 and a plurality of reflecting units 11. Each reflecting unit 11 can be converted among a plurality of phases through independently adjusting controllable parameters of the controller 10. Optionally, the plurality of phases can be uniformly configured based on 360-degree phases in a manner of corresponding to the number of phases. Taking four phases as an example, the corresponding adjustable phases are an initial phase degree plus 0 degrees, 90 degrees, 180 degrees and 270 degrees, respectively. If the initial phase degree is 45 degrees, the four phases are 45 degrees, 135 degrees, 225 degrees and 315 degrees, respectively. Specifically, a phase difference between neighboring phases in the plurality of phases in each reflecting unit is defined by dividing 360 degrees by the corresponding number of phases. For example, if each reflecting unit 11 has three phases, the phase difference between the neighboring phases is 120 degrees. If each reflecting unit 11 has four phases, the phase difference between the neighboring phases is 90 degrees. Preferably, each reflecting unit 11 has a plurality of phase numbers/phases, with the plurality of phases referring to at least two phases. For example, the number can be selected from one of 2, 3, 4 . . . , N; with N being an appropriate positive integer, such as 36, 360 or other higher values. The value of N is not limited in the present invention, where the value of N can correspond to the number of phases and to an interval for modifying the angles of the phases.

The user equipment 2 can receive the RIS signal reflected or transmitted by the reconfigurable intelligence surface 1, so that the reconfigurable intelligence surface 1 and the user equipment 2 form a signal-based coupling relationship. Specifically, in the signal-based coupling relationship between the reconfigurable intelligence surface 1 and the user equipment 2, the reconfigurable intelligence surface 1 forms the signal-based coupling relationship with the user equipment 2 through the plurality of reflecting units 11 in a reflection area RA, and thus the quality of the RIS signal received by the user equipment 2 is determined according to the phase of each reflecting unit 11 in the corresponding reflection area RA. The current phase of each reflecting unit 11 coupled with the user equipment 2 can be defined as a current phase combination. In the signal-based coupling relationship between the reconfigurable intelligence surface 1 and a plurality of user equipment 2, the reconfigurable intelligence surface 1 forms the signal-based coupling relationship with the plurality of user equipment 2 through the plurality of reflecting units 11 in a plurality of groups of reflection areas RA, and the composition of the plurality of reflecting units 11 in any group of reflection areas RA is different from that of the plurality of reflecting units 11 in other groups of reflection areas RA.

Figure 2:
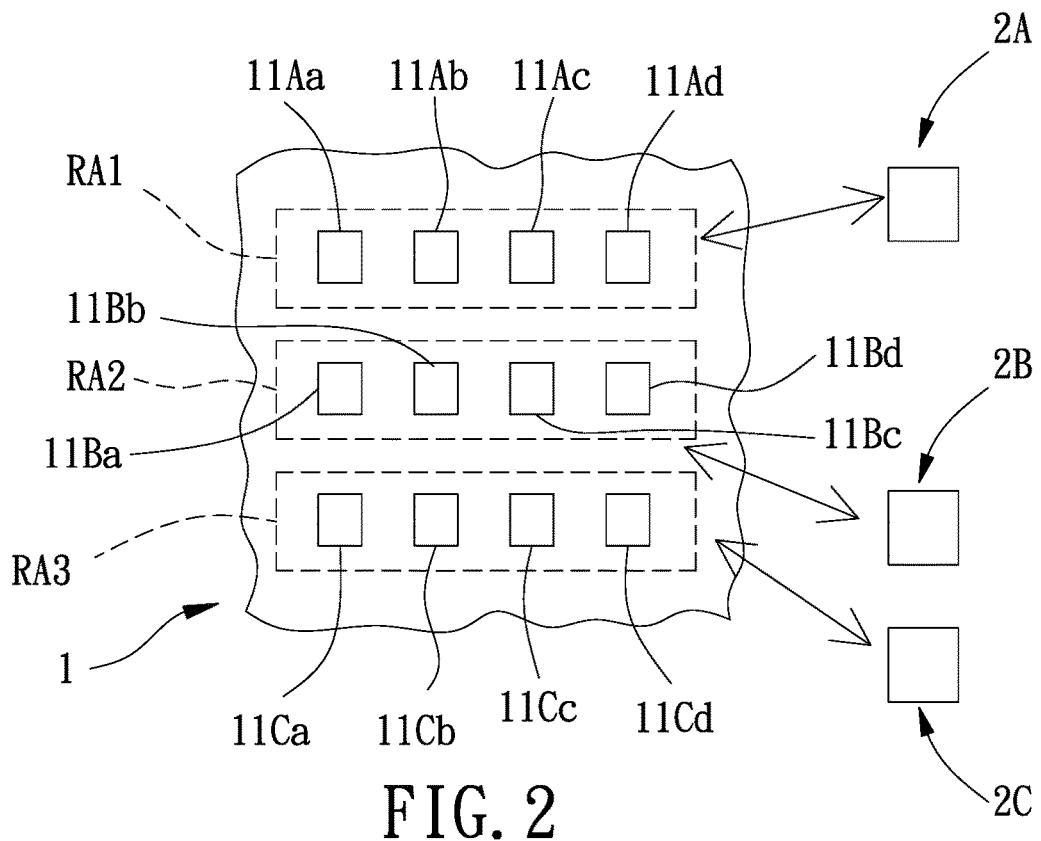
FIG. 2 is a schematic diagram of a communication mechanism between a reconfigurable intelligence surface and user equipment.

More specifically, FIG. 2 is an example showing grouped reflection areas RA1, RA2, RA3, reflecting units [11Aa-11Ad], [11Ba-11Bd] and [11Ca-11Cd] respectively corresponding to the reflection areas RA1, RA2 and RA3, and reflection areas RA1, RA2 and RA3 respectively corresponding to user equipment 2A, 2B and 2C.

In addition, the following Table 1 shows the configuration of the current phase of each reflecting unit [11Aa-11Ad], [11Ba-11Bd] and [11Ca-11Cd] in each reflection area RA1, RA2 and RA3 corresponding to each user equipment 2A, 2B and 2C. Each user equipment 2A, 2B and 2C has a corresponding current phase combination. It should be noted that, in the example in FIG. 2 and Table 1, although each user equipment 2A, 2B and 2C is allocated with four reflecting units [11Aa-11Ad], [11Ba-11Bd] and [11Ca-11Cd], the present invention is not limited in this regard, and the number of the reflecting units corresponding to the user equipment can be configured according to actual requirements.

TABLE 1

Configuration of user equipment, reflection area, reflecting unit and current phase.

| User Equipment | Reflection Area | Reflecting Unit and Corresponding Current Phase | | | | |
|---|---|---|---|---|---|---|
| 2A | RA1 | Reflecting Unit | 11Aa | 11Ab | 11Ac | 11Ad |
|  |  | Current Phase | 90 | 0 | 180 | 90 |
| 2B | RA2 | Reflecting Unit | 11Ba | 11Bb | 11Bc | 11Bd |
|  |  | Current Phase | 90 | 270 | 0 | 90 |
| 2C | RA3 | Reflecting Unit | 11Ca | 11Cb | 11Cc | 11Cd |
|  |  | Current Phase | 180 | 0 | 180 | 270 |

In addition, a performance evaluation module 21 is built in the user equipment 2 and configured to generate a performance indicator according to the RIS signal. For example, the performance evaluation module 21 can generate a corresponding performance indicator through an application program installed in a mobile phone of a terminal user. The performance indicator refers to signal strength, and the signal strength value is usually in the unit of dBm or dB. Optionally, the performance indicator can further include any of a signal-to-noise ratio (S/N ratio), a channel capacity and a bit error rate (BER). It is noted that the performance evaluation module 21 and the performance indicator can be carried out through corresponding software or application programs, and can be understood by one having ordinary skill in the art.

More specifically, the signal strength, the signal-to-noise ratio, the channel capacity and the bit error rate are different signal indexes, and each signal index has a corresponding numerical value according to a predefined numerical value calculation method. The performance indicator can be a numerical value corresponding to one of the signal indexes, or the performance indicator can be a (comprehensive) numerical value corresponding to more than one of the signal indexes. The numerical value or the comprehensive numerical value is a result calculated through a predefined formula/way, and may include the application of normalization of the weight and/or the data. If the performance indicator is a numerical value corresponding to one or more of the signal indexes, a performance threshold value can be defined as an unchanged specific numerical value (a first performance threshold value) in the corresponding performance indicator, and/or a numerical value (a second performance threshold value) corresponding to the performance threshold value can be defined to be higher than a numerical value corresponding to a performance indicator (serving as a comparison reference value) of an initial phase combination by a specific difference value. Thus, the second performance threshold value can form a variable numerical value according to the comparison reference value. In other words, no matter what the numerical value of the performance indicator corresponding to the initial phase combination is, the values corresponding to the first performance threshold values are the same constant and can be used as a high-standard quality standard. Differently, the second performance threshold value is defined as a numerical value formed by adding a specific difference value to the performance indicator of the initial phase combination, and can be set by requirements (having a variable characteristic) to be used as a relative quality check standard. Wherein, the initial phase combination refers to a phase combination of the RIS signal currently received from the reconfigurable intelligence surface 1 and utilized by the user equipment 2, and the phase combination is not optimized/adjusted (such as the following "phase combination optimization process P1") or obtained after optimization/modifying (such as the following "current optimal phases combination or "real optimum phases combination). In other words, said initial phase combination is defined by a preset phase combination applied to initially make a connection between the reconfigurable intelligence surface 1 and the user equipment 2.

For example, taking a performance indicator as a signal strength distribution from −110 dBm to −40 dBm as an example, if the performance threshold value (the first performance threshold value) is defined as the specific numerical value, the performance threshold value can be defined as any of −85 dBm to −60 dBm (namely any of −85 dBm, −84 dBm, −83 dBm, . . . , −61 dBm and −60 dBm). Similarly, taking the performance indicator as the signal strength distribution from −110 dBm to −40 dBm as an example, if the performance threshold value (the second performance threshold value) is defined as the performance indicator equal to or higher than the specific difference value of an initial phase combination, the specific difference value can be defined as a reasonable difference value, such as 5 dBm. Therefore, if the performance indicator of the initial phase combination is −85 dBm, the performance threshold value (the second performance threshold value) is −80 dBm; and if the performance indicator of the initial phase combination is −80 dBm, the performance threshold value (the second performance threshold value) is −75 dBm. It is noted that the "reasonable" difference value corresponding to the specific difference value can be changed according to different user equipment 2 and/or different reconfigurable intelligence surfaces 1.

It is noted that the above definition of the two performance threshold values can be applied simultaneously. For example, if the first performance threshold value is the specific numerical value, the second performance threshold value is the specific difference value, and the phase combination optimization can be performed through the second performance threshold value only when the performance indicator of the initial phase combination is less than the first performance threshold value. In this respect, when a situation that the performance indicator of the current modified phase combination is not less than the first performance threshold value or a situation that the second performance threshold value is met, the current modified phase combination is used as an optimized phase combination, and the current optimization is ended (corresponding to the following phase combination optimization process P1). For example, similarly, taking a performance indicator as a signal strength distribution from −110 dBm to −40 dBm as an example, the first performance threshold value can be defined as −70 dBm, and the specific difference value of the second performance threshold value can be defined as 5 dBm. In a situation that the performance indicator of the initial phase combination is −78 dBm, the performance indicator of the current modified phase combination is −72 dBm or −71 dBm, and the current modified phase combination is used as the optimized phase combination since the second performance threshold value is met (although the first performance threshold value is not met). In a situation that the performance indicator of the initial phase combination is −75 dBm, and the performance indicator of the current modified phase combination is not less than −70 dBm, since the first performance threshold value and the second performance threshold value are met at the same time, the current modified phase combination is used as the optimized phase combination. In a situation that the performance indicator of the initial phase combination is −71 dBm, and the performance indicator of the current modified phase combination is not less than −70 dBm and less than −66 dBm, the current modified phase combination is used as the optimized phase combination since the first performance threshold value is met (although the second performance threshold value is not met).

According to the above, the present invention provides the method for signal optimization between the user equipment and the reconfigurable intelligence surface. The user equipment 2 is coupled with the reconfigurable intelligence surface 1, has a preset performance threshold value and executes an RIS phase modifying process shown in FIG. 3. The RIS phase modifying process includes a phase combination optimization process P1 and an optional continuous monitoring process P2. The preset performance threshold value may include the first performance threshold value and/or the second performance threshold value.

The phase combination optimization process P1 includes the following steps:

A current performance generation step S11: generating an RIS signal according to the current phase combination formed by the current phase of each reflecting unit 11 through the reconfigurable intelligent surface 1; receiving the RIS signal by the user equipment 2; and generating a corresponding performance indicator through the performance evaluation module 21 according to the RIS signal. Afterwards, a current performance evaluating step S12 is carried out.

Specifically, when the user equipment 2 is coupled to the reconfigurable intelligence surface 1, the reconfigurable intelligence surface 1 allocates a plurality of reflecting units 11 to the user equipment, and the current phase combination is formed according to the current phase arrangement of the plurality of reflecting units. Furthermore, the current phase combination reflects a signal from a base station or transmits the signal in a manner of amplifying the signal, so as to generate an RIS signal.

A current performance evaluating step S12: evaluating whether the performance indicator corresponding to the current phase combination is not less than the preset performance threshold value; and continuing to perform the following real optimum phase combination determining step S13 or phase optimization step S14 according to the evaluation result.

A real optimum phase combination determining step S13: coupling the reconfigurable intelligent surface 1 with the user equipment 2 by the corresponding RIS reflected by the current phase combination in a state that the performance indicator is not less than the preset performance threshold value. At this moment, the current phase combination is defined as a real optimum phase combination. Therefore, the user equipment 2 can be coupled with the reconfigurable intelligent surface 1 with better signal quality in the state that the performance indicator corresponding to the current phase combination is not less than the preset performance threshold value. Optionally, the following continuous monitoring process P2 can be continued.

The phase optimization step S14: generating at least one modified phase combination corresponding to the applied phase modifying method based on the current phase combination in a state that the performance indicator of the current phase combination is less than the preset performance threshold value so that the combination formed by the phases of the reflecting units 11 in the current phase combination is different from the modified phase combination; and evaluating whether the performance indicator corresponding to the modified phase combination is not less than the preset performance threshold so as to determine an optimized phase combination; in the condition that the performance indicator of the optimized phase combination is not less than the preset performance threshold, replacing the current phase combination with the optimized phase combination to become an updated current phase combination.

It should be noted that the phase modifying method can be a random selection method (such as a Random Max Sampling Algorithm), a Conditional Sample Mean (CSM) or any algorithm, and can be a Neighboring Phase Adjusting Method provided by the present invention. The present invention is not limited to the above phase modifying methods.

More specifically, in the phase optimization step S14, if a new modified phase combination is generated, the controller 10 of the reconfigurable intelligent surface 1 is configured to adjust the phase of the corresponding reflecting unit 11 to generate a corresponding RIS signal according to the modified phase combination, and then the user equipment 2 is configured to receive the corresponding RIS signal to generate a performance indicator corresponding to the modified phase combination. As a result, the performance indicator can be evaluated relative to the performance indicator of the current phase combination.

Preferably, in the phase optimization step S14, whether the performance indicator corresponding to the modified phase combination is not less than the preset performance threshold value is evaluated, and moreover, whether the performance indicator corresponding to the modified phase combination is greater than the performance indicator corresponding to the current phase combination is also evaluated. More particularly, if the performance indicator corresponding to the modified phase combination is less than the preset performance threshold value, whether the performance indicator corresponding to the modified phase combination is greater than the performance indicator corresponding to the current phase combination is evaluated. Therefore, the following three comparison results are obtained corresponding to the comparison conditions above.

First optimization result R1 (referring to FIGS. 3-4): in the corresponding phase modifying method, if the performance indicators of all modified phase combinations are less than the preset performance threshold value and are not greater than the performance indicator of the current phase combination (the initial phase combination in this case), the current phase optimization step S14/phase combination optimization process P1 is ended, and the current phase combination is taken as the current optimal phase combination. Therefore, the current phase combination is less than the preset performance threshold, but the current phase combination (initial phase combination) is not inferior to the performance indicators of all (the previous) modified phase combinations, and thus the user equipment 2 and the reconfigurable intelligence surface 1 can be coupled with better signal quality.

It should be noted that the term "previous" in the term "the previous modified phase combinations" refers to all modified phase combinations generated based on the applied phase modifying method in the same phase combination optimization process P1. More particularly, the combination formed by the phase of each reflecting unit 11 in any modified phase combination is unique and differs from the phase combinations of the other modified phase combinations. It should be noted that the phase combination is considered to be different as long as any of the plurality of phases in any two phase combinations is different. For example, if the phase combination is composed of four reflecting units 11 and each reflecting unit 11 can be adjusted to be 0 degrees, 90 degrees, 180 degrees and 270 degrees, the two phase combinations [0 degrees, 0 degrees, 0 degrees, 0 degrees] and [90 degrees, 0 degrees, 0 degrees, 0 degrees] are considered to be different from each other.

Second optimization result R2 (referring to FIGS. 3-4): in the corresponding phase modifying method, if the performance indicator of the modified phase combination is not less than the preset performance threshold value, the modified phase combination replaces the current phase combination to become an updated current phase combination, and the current phase optimization step S14/phase combination optimization process P1 is ended to obtain a real optimized phase combination.

Third optimization result R3 (referring to FIGS. 3-4): in the corresponding phase modifying method, if the performance indicator of at least one modified phase combination is greater than the performance indicator of the current phase, and the performance indicators of all modified phase combinations are less than the preset performance threshold value, the current phase combination is replaced by the one with the maximum threshold value (referring to have the best performance) in the at least one modified phase combination to become the updated current phase combination, and the current phase optimization step S14/phase combination optimization process P1 is ended to obtain a real optimized phase combination.

According to the preferred phase optimization step S14, the phase combination with better performance threshold value can still be determined as the current phase combination in the situation that the performance indicators of all modified phase combinations generated in the applied phase modifying method are less than the preset performance threshold value. Therefore, the situation that the phase modifying method only takes the "value not less than the preset performance threshold value" as the condition for determining the feasible phase combination, and all the phase combinations in the current state cannot meet the condition, resulting in divergence of the phase modifying methods can be avoided.

It should be noted that the term "all" in the term "all modified phase combinations" refers to all modified phase combinations that can be generated according to actual situations in the applied phase modifying method.

It should be noted that as shown in FIG. 1, the mechanism of phase modifying in the steps above can be implemented through the decision control module 3 which can be deemed as a controller/processor. Specifically, the decision control module 3 has the preset performance threshold value, is configured to receive the performance indicator generated by the user equipment 2 (deriving from that the user equipment 2 receives the RIS signal generated by the current phase combination/modified phase combination of the reconfigurable intelligence surface 1) to perform performance evaluation operation. Then, the decision control module 3 is configured to determine how to define the modified phase combination to generate a corresponding modifying instruction according to the corresponding phase modifying method, and to transmit the modifying instruction to the controller 11 of the reconfigurable intelligence surface 1 to control the phase of the corresponding reflecting unit 11 to change according to the modifying instruction through the controller 11 so as to generate the modified phase combination in the phase modifying method, thereby achieving the phase modifying mechanism. More specifically, the performance evaluation operation includes: evaluating whether the performance indicator of the current phase combination is not less than the preset performance threshold value, and/or evaluating whether the performance indicator of the modified phase combination is greater than the preset performance indicator of the current phase combination. Optionally, the decision control module 3 belongs to either the reconfigurable intelligence surface 1 or the user equipment 2 and is executed correspondingly, so that the corresponding executor (the reconfigurable intelligence surface 1 or the user equipment 2) forms a master control terminal for phase modifying. Optionally, the decision control module 3 can be executed through other apparatuses (such as a cloud platform) different from the reconfigurable intelligence surface 1 or the user equipment 2.

With the above phase combination optimization process P1, the method can determine whether to modify the phase combination of the reconfigurable intelligent surface 1 by evaluating the performance indicator of the user equipment 2, so that the user equipment 2 can have a better performance indicator. In other words, a better phase combination and a better performance indicator can be obtained through the phase combination optimization simply by coupling the reconfigurable intelligent surface 1 and the user equipment 2 and matching/applying a corresponding evaluation modifying mechanism (referring to the phase optimization step S14). Therefore, by said mechanisms/configurations of this invention, a complex coupling relationship formed among three different apparatuses as the base station, the reconfigurable intelligent surface and the user equipment in the prior art is avoided, and complex operation mechanisms can be also avoided. Thus, the complexity of phase combination optimization calculation is reduced, and the corresponding hardware requirement is reduced (or the better operational performance can be obtained through the hardware of the same level), so that the cost of method execution or system establishment can be reduced, and the operational performance is improved.

Figure 3:
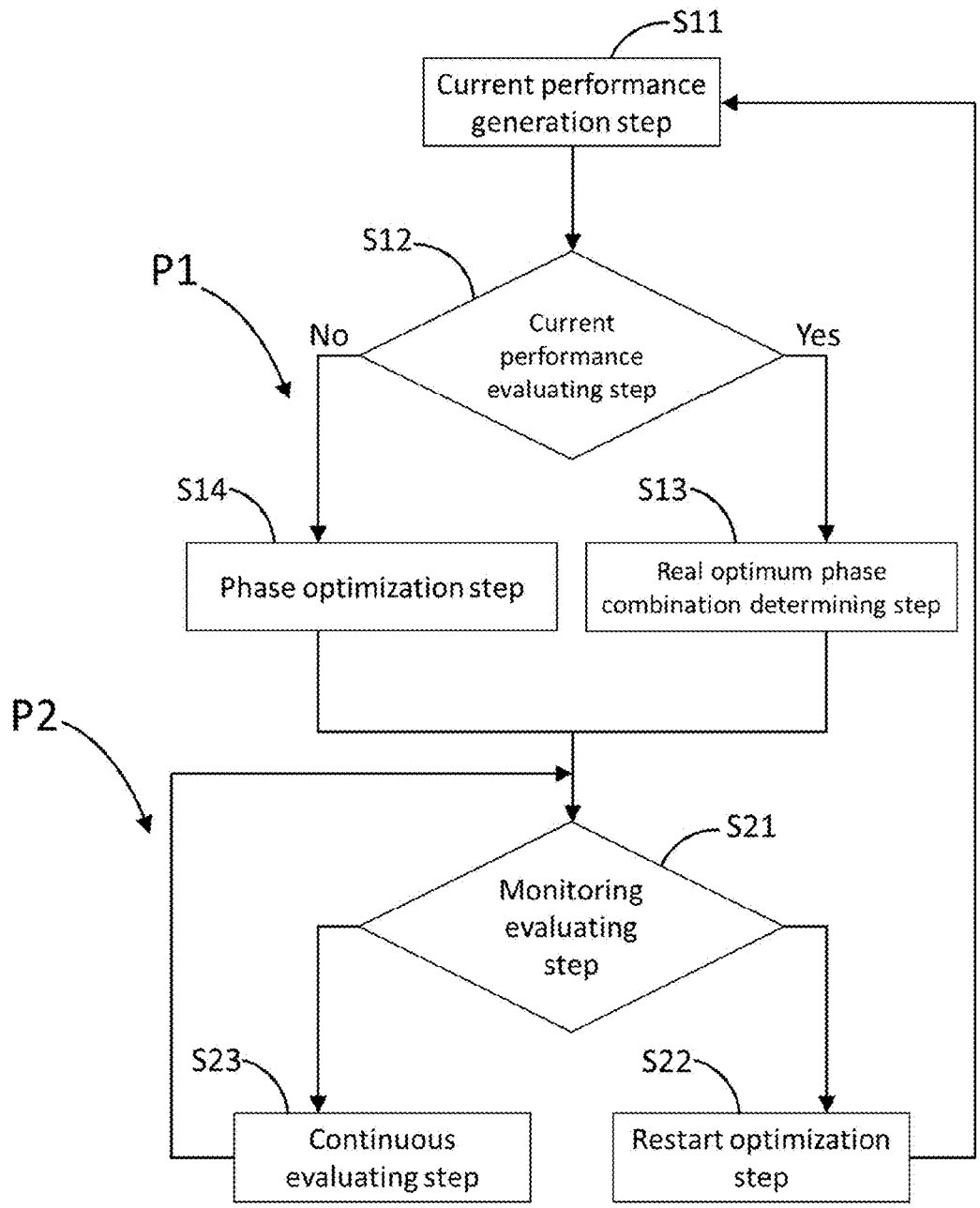
FIG. 3 is a flowchart of an RIS phase modifying flow according to the present invention.

As shown in FIG. 3, the continuous monitoring process P2 includes the following steps:

A monitoring evaluating step S21: determining whether a restart optimization condition is met or not based on the current phase combination (such as the real optimum phase combination or the current optimal phase combination) acquired after each phase combination optimization process P1; and then, continuing to perform the following restart optimization step S22 or the continuous evaluating step S23 according to the evaluation result.

Preferably, the restart optimization condition may include an accumulated time condition and/or a variable distance condition and/or a performance indicator weakening condition. The accumulated time condition is to determine whether the accumulated time/duration for executing the current phase combination is not less than the time threshold value. The variable distance condition is to determine whether a moving distance of the user equipment 2 is not less than a distance threshold value. The performance indicator weakening condition is to determine whether the performance indicator of the current phase combination (varying with time, the position of the user equipment 2 or other factors) at present is reduced equal to or over a specific difference value compared to the current phase combination itself at a pervious timing to be determined as the optimized phase combination. Taking the performance indicator as signal strength as an example, the specific difference value is set as 5 dBm, if the performance indicator of the current phase combination at the previous timing to be determined as the optimized phase combination is −70 dBm, and the performance indicator instantly corresponding to the current phase combination in the subsequent (after said previous timing, especially in the monitoring evaluating step S21) is not greater than −75 dBm, the restart optimization condition is met. Preferably, if the second performance threshold value is provided, the absolute value of the specific difference value is equal to the absolute value of the specific difference value.

More specifically, in the accumulated time condition, after each current phase combination is acquired by the phase combination optimization process P1, the accumulated time for executing the current phase is returned to zero and re-accumulated. In other words, even if a new current phase combination newly acquired is the same as the current phase combination obtained last time, the accumulated time for executing the current phase combination newly acquired is returned to zero at the moment acquiring the new current phase combination to accumulate the corresponding execution time again. Similarly, in the variable distance condition, after each current phase combination is acquired in the above steps, the position of the user equipment 2 at present is taken as an original point, and the corresponding moving distance is re-calculated. In addition, in the performance indicator weakening condition, when the current phase combination is determined to be the optimized phase combination, the numerical value corresponding to the performance indicator is recorded to serve as the reference of subsequent evaluation and comparison.

Restart optimization step S22: repeating/returning to the current performance evaluating step S12 in a state that the restarting optimization condition is met.

Continuous evaluating step S23: repeating/returning to the monitoring evaluating step S21 in a state that the restarting optimization condition is not met.

With the continuous monitoring process P2, the current phase combination distributed to the user equipment 2 by the reconfigurable intelligence surface 1 of the present invention can be continuously monitored and/or updated/modified, so that the user equipment 2 can continuously operate with a better performance indicator.

Preferably, the phase modifying method adopted in the phase optimization step S14 is the neighboring phase adjusting method provided by the present invention. In the neighboring phase adjusting method, the modified phase combination is formed by a neighboring phase defined in the adjacent interval of the reference phase defined by the current phase of each of reflecting units 11 corresponding to the current phase combination, and corresponding phase modifying is performed only for one of the reflecting units 11 each time. When a new modified phase combination is formed each time, an evaluation is performed to check whether the performance indicator corresponding to the modified phase combination is not less than the preset performance threshold value and/or whether the performance indicator corresponding to the modified phase combination is greater than the performance indicator corresponding to the current phase. Specifically, before phase modifying is started, the current phase of each reflecting unit 11 is taken as a reference phase, at least one neighboring phase is defined by being selected in the adjacent interval based on the reference phase in a clockwise phase direction and/or an anticlockwise phase direction, and the at least one neighboring phase is closer to the reference phase in the selected phase direction than other phases which are not defined in the adjacent interval. Taking a reflecting unit 11 with 8 phases as an example, the corresponding phases can be 0 degrees, 45 degrees, 90 degrees, 135 degrees, 180 degrees, 225 degrees, 270 degrees and 315 degrees, respectively. 0 degrees is taken as the reference phase, and then two neighboring phases in the clockwise phase direction and the anticlockwise phase direction of the reference phase are taken as an example, the two neighboring phases in the clockwise phase direction are 45 degrees and 90 degrees subsequently; and the two neighboring phases in the anticlockwise phase direction are 315 degrees and 270 degrees subsequently. Preferably, during phase modifying, the one with smaller phase difference between the phase of the at least one neighboring phase, having not been formed the modified phase combination, and the reference phase is determined to have a higher priority for forming a modified phase combination. Preferably, the corresponding neighboring phases are selected based on the principle that the number of the corresponding phases in the clockwise direction and the anticlockwise direction is the same based on the reference phase. If a phase respectively selected in the two directions are repeated, the repeated phases will be considered as one single neighboring phase rather than two neighboring phases, thus avoiding repeated works in the phase combination optimization process. Preferably, a phase difference between the selected neighboring phases and the initial phase (referring to the reference phase) is not greater than 135 degrees, more preferably not greater than 90 degrees.

In the same reflecting unit 11, if the performance indicator of the modified phase combination formed by any of neighboring phases is not less than the preset performance threshold value or greater than the performance indicator corresponding to the current phase, the modified phase combination replaces the current phase combination to become the updated current phase combination; at this situation, for the current one reflecting unit, if there are other neighboring phases within said adjacent interval having not been formed the modified phase combinations, no new modified phase combinations will be formed according to the other neighboring phases. Moreover, if the performance indicator of the modified phase combination is not less than the preset performance threshold value, the phase optimization step S14 is ended. Still, if the performance indicators of all modified phase combinations are all less than the preset performance threshold value, the phase optimization step S14 is ended. Wherein, any one of the above-mentioned the first optimization result R1, the second optimization result R2 and the third optimization result R3 would be generated during the phase optimization step S14 by the neighboring phase adjusting method.

It should be noted that the phase modifying method used in the initial phase combination optimization process P1 is not limited by the neighboring phase adjusting method, and preferably the phase modifying method used in the phase combination optimization process P1 triggered again by the continuous monitoring process P2 is the neighboring phase adjusting method. Optionally, the neighboring phase adjusting method can also be used in the initial and the following phase combination optimization processes P1.

Figure 4:
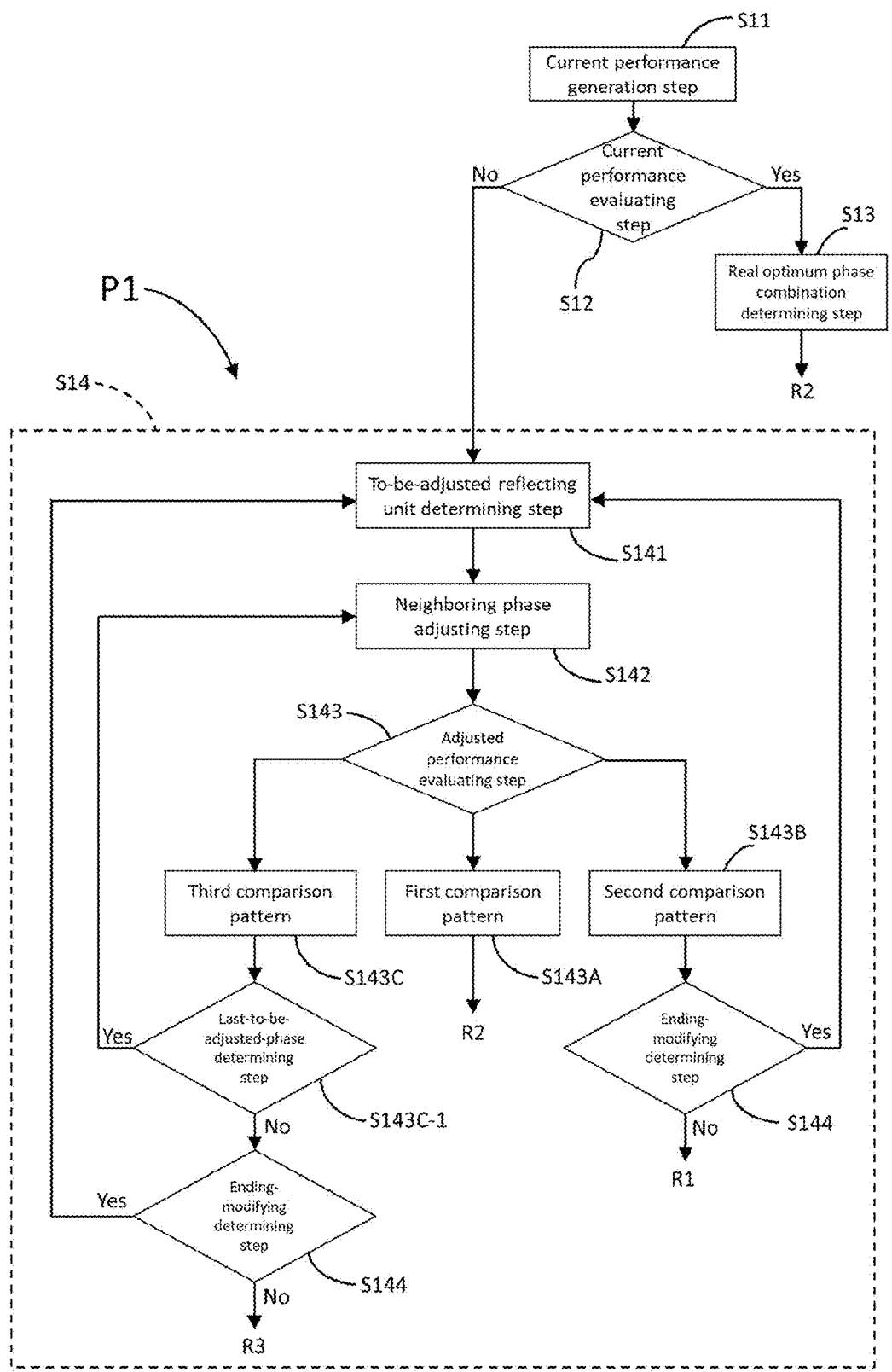
FIG. 4 is a flowchart of a neighboring phase optimization method according to the present invention.

In detail, FIG. 4 shows an example of the specific execution steps of the neighboring phase adjusting method (comprising the following steps S141, S142, S143, S143A, S143B, S143C, S143C-1 and S144) according to the present invention.

A to-be-adjusted reflecting unit determining step S141 includes: determining the reflecting unit 11 which has not been adjusted for the current phase combination in the same process of the phase combination optimization process P1 as a to-be-adjusted unit. Then, continuing to perform the neighboring phase adjusting step S142.

A neighboring phase adjusting step S142 includes: every time to generate a new modified phase combination, adjusting one phase of the to-be-adjusted reflecting unit to be one of at least one neighboring phase having not been formed a modified phase combination, wherein said at least one neighboring phase is defined within an adjacent interval of a reference phase of the to-be-adjusted reflecting unit.

The adjusted performance evaluating step S143 includes: evaluating whether the performance indicator corresponding to the modified phase combination is not less than the preset performance threshold value and/or is larger than the performance indicator corresponding to the current phase combination, and providing the following three comparison patterns and corresponding steps.

A first comparison pattern S143A: replacing the current phase combination with the modified phase combination to form an updated current phase combination when the performance indicator of the modified phase combination is not less than the preset performance threshold value, and ending the phase optimization step to obtain a real optimized phase combination which is corresponding to the second optimization result R2.

A second comparison pattern S143B: replacing the current phase combination with the modified phase combination to form an updated current phase combination when the performance indicator of the modified phase combination is less than the preset performance threshold value but greater than the performance indicator of the current phase combination. Then, ending adjusting the phase of the to-be-adjusted reflecting unit 11, and continuing to perform the ending-modifying determining step S144.

A third comparison pattern S143C: continuing to perform the following last-to-be-adjusted-phase determining step S143C-1 to confirm whether each of the at least one neighboring phase corresponding to the to-be-adjusted reflecting unit has been formed the modified phase combination, when the performance indicator of the modified phase combination is less than the preset performance threshold value and not greater than the performance indicator of the current phase.

The last-to-be-adjusted-phase determining step S143C-1 includes: confirming whether each of at least one neighboring phase corresponding to the reflecting unit 11 has been formed the modified phase combination. If not, namely, if there is any one of the at least one neighboring phase having not been formed a modified phase combination, repeating/returning to the neighboring phase adjusting step S142; and if so, namely, if each of the at least one neighboring phase has been formed the modified phase combination, continuing to perform the following ending-modifying determining step S144.

The ending-modifying determining step S144 includes: confirming/determining whether there is any reflecting unit 11 having not been adjusted in the same process of the phase combination optimization process P1. If the result shows that there is any reflecting unit 11 having not been adjusted, repeating/returning to the to-be-adjusted reflecting unit determining step S141. Wherein, in the condition that this step S144 is performed following the second comparison pattern S143B, if the result shows that all reflecting units 11 have been adjusted, ending the phase optimization step S14 to obtain a current optimal phase combination which is corresponding to the third optimization result R3. Wherein, in the condition that this step S144 is performed following the third comparison pattern S143C, if the result shows that all reflecting units 11 have been adjusted, ending the phase optimization step S14 to obtain a current optimal phase combination. At this condition (step S144 followed step S143C), if any reflecting unit 11 meets the situation of the second comparison pattern S143B during the phase modifying process, the current optimal phase combination corresponds to the third optimization result R3; and if all reflecting units 11 only meets the situation of the third comparison pattern S143C during the phase modifying process, the current optimal phase combination corresponds to the first optimization result R1.

According to FIGS. 3-4 and the above-mentioned neighboring phase adjusting method, examples of the following Tables 2 to 6 are listed to illustrate the neighboring phase adjusting method according to the present invention with two reflecting units 11 (marked as 11a and 11b in the following tables) distributed as a reflection area RA coupled with the user equipment 2, each reflecting unit 11 having four phases (such as 0 degrees, 90 degrees, 180 degrees and 270 degrees), and taking one neighboring phase respectively in the clockwise direction and in the anticlockwise direction (namely 90 degrees and 270 degrees).

TABLE 2

Example of the first optimization result R1.

| Modifying times | Corresponding content | Reflecting unit 11a Phase | Reflecting unit 11b Phase | Evaluation result |
|---|---|---|---|---|
| Unadjusted | Current phase combination | 0 | 0 | S12 *Less than the preset performance threshold value. (Continue to perform S14) |
|  | Corresponding steps |  |  | S11→S12 (→S14) |
| 1 | Modified phase combination | 90 | 0 | S143C *Less than the preset performance threshold value and not greater than the performance indicator of the current phase; |

TABLE 2-continued

Example of the first optimization result R1.

| Modifying times | Corresponding content | Reflecting unit 11a Phase | Reflecting unit 11b Phase | Evaluation result |
|---|---|---|---|---|
| | | | | *Current phase combination [0, 0] is not replaced by [90, 0]. S143C-1 *There is at least one neighboring phase that has not been formed the modified phase combination. (Continue to perform S142) |
| | Corresponding steps | | | S14: S141→S142→S143→S143C→S143C-1 (→S142) |
| 2 | Modified phase combination | 270 | 0 | S143C *Less than the preset performance threshold value and not greater than the performance indicator of the current phase; *Current phase combination [0, 0] is not replaced by [270, 0]. S143C-1 *Each of the at least one neighboring phase has been formed the modified phase combination. S144 *There is still a reflecting unit without being adjusted. (Continue to perform S141) |
| | Corresponding steps | | | →S142→S143→S143C→S143C-1→S144 (→S141) |
| 3 | Modified phase combination | 0 | 90 | S143C *Less than the preset performance threshold value and not greater than the performance indicator of the current phase; *Current phase combination [0, 0] is not replaced by [0, 90]. S143C-1 *There is at least one neighboring phase that has not been formed the modified phase combination. (Continue to perform S142) |
| | Corresponding steps | | | →S141→S142→S143→S143C→S143C-1 (→S142) |
| 4 | Modified phase combination | 0 | 270 | S143C *Less than the preset performance threshold value and not greater than the performance indicator of the current phase; *Current phase combination [0, 0] is not replaced by [0, 270]. S143C-1 *Each of the at least one neighboring phase has been formed the modified phase combination. S144 *All reflecting units have been adjusted. (Result R1) |
| | Corresponding steps | | | →S142→S143→S143C→S143C-1→S144 (Result: R1) |
| | First optimization result R1 | | | The original current phase combination [0, 0] is taken as the current optimal phase combination. |

TABLE 3

Example of the second optimization result R2.

| Modifying times | Corresponding content | Reflecting unit 11a Phase | Reflecting unit 11b Phase | Evaluation Result |
|---|---|---|---|---|
| Unadjusted | Current phase combination | 0 | 0 | S12<br>*Less than the preset performance threshold value.<br>(Continue to perform S14) |
|  | Corresponding steps |  |  | S11→S12<br>(→S14) |
| 1 | Modified phase combination | 90 | 0 | S143A<br>*Not less than the preset performance threshold value;<br>*Current phase combination is updated to be [90, 0].<br>(Result R2) |
|  | Corresponding steps | S14: S141→S142→S143→S143A (Result: R2) | | |
| Second optimization result R2 | | The current phase combination [90, 0] is taken as the real optimal phase combination. | | |

TABLE 4

Another Example of the second optimization result R2.

| Modifying times | Corresponding content | Reflecting unit 11a Phase | Reflecting unit 11b Phase | Evaluation Result |
|---|---|---|---|---|
| Unadjusted | Current phase combination | 0 | 0 | S12<br>*Less than the preset performance threshold value.<br>(Continue to perform S14) |
|  | Corresponding steps |  |  | S11→S12<br>(→S14) |
| 1 | Modified phase combination | 90 | 0 | S143C<br>*Less than the preset performance threshold value and not greater than the performance indicator of the current phase;<br>*Current phase combination [0, 0] is not replaced by [90, 0]<br>S143C-1<br>*There is at least one neighboring phase that has not been formed the modified phase combination.<br>(Continue to perform S142) |
|  | Corresponding steps | S14: S141→S142→S143→S143C→S143C-1 (→S142) | | |
| 2 | Modified phase combination | 270 | 0 | S143B<br>*Less than the preset performance threshold value and greater than the performance indicator of the current phase;<br>*Current phase combination is updated to be [270, 0].<br>S144<br>*There is still a reflecting unit without being adjusted.<br>(Continue to perform S141) |
|  | Corresponding steps | →S142→S143→S143B→S144 (→S141) | | |

TABLE 4-continued

Another Example of the second optimization result R2.

| Modifying times | Corresponding content | Reflecting unit 11a Phase | Reflecting unit 11b Phase | Evaluation Result |
|---|---|---|---|---|
| 3 | Modified phase combination | 270 | 90 | S143C<br>*Less than the preset performance threshold value and not greater than the performance indicator of the current phase;<br>*Current phase combination [270, 0] is not replaced by [270, 90].<br>S143C-1<br>*There is at least one neighboring phase that has not been formed the modified phase combination.<br>(Continue to perform S142) |
| | Corresponding steps | →S141→S142→S143→S143C→S143C-1<br>(→S142) | | |
| 4 | Modified phase combination | 270 | 270 | S143A<br>*Not less than the preset performance threshold value;<br>*Current phase combination is updated to be [270, 270].<br>(Result R2) |
| | Corresponding steps | →S142→S143→S143A<br>(Result: R2) | | |
| Second optimization result R2 | The current phase combination [270, 270] is taken as the real optimal phase combination. | | | |

TABLE 5

Example of the third optimization result R3.

| Modifying times | Corresponding content | Reflecting unit 11a Phase | Reflecting unit 11b Phase | Evaluation Result |
|---|---|---|---|---|
| Unadjusted | Current phase combination | 0 | 0 | S12<br>*Less than the preset performance threshold value.<br>(Continue to perform S14) |
| | Corresponding steps | | | S11→S12<br>(→S14) |
| 1 | Modified phase combination | 90 | 0 | S143B<br>*Less than the preset performance threshold value and greater than the performance indicator of the current phase;<br>*Current phase combination is updated to be [90, 0].<br>S144<br>*There is still a reflecting unit without being adjusted.<br>(Continue to perform S141) |
| | Corresponding steps | | | S14: S141→S142→S143→S143B→S144<br>(→S141) |
| 2 | Modified phase combination | 90 | 90 | S143C<br>*Less than the preset performance threshold value and not greater than the performance indicator of the current phase; |

TABLE 5-continued

Example of the third optimization result R3.

| Modifying times | Corresponding content | Reflecting unit 11a Phase | Reflecting unit 11b Phase | Evaluation Result |
|---|---|---|---|---|
| 3 | Corresponding steps | | | *Current phase combination [90, 0] is not replaced by [90, 90]. S143C-1 *There is at least one neighboring phase that has does not been formed the modified phase combination. (Continue to perform S142) →S141→S142→S143→S143C→S143C-1 (→S142) |
| | Modified phase combination | 90 | 270 | S143C *Less than the preset performance threshold value and not greater than the performance indicator of the current phase; *Current phase combination [90, 0] is not replaced by [90, 270]. S143C-1 *All reflecting units are modified. (Result R3) |
| | Corresponding steps | | →S142→S143→S143C→S143C-1→S144 (Result: R3) | |
| Third optimization result R3 | | The current phase combination [90, 0] is taken as the current optimal phase combination. | | |

TABLE 6

Example of the third optimization result R3.

| Modifying times | Corresponding content | Reflecting unit 11a Phase | Reflecting unit 11b Phase | Evaluation Result |
|---|---|---|---|---|
| Unadjusted | Current phase combination | 0 | 0 | S12 *Less than the preset performance threshold value. (Continue to perform S14) |
| 1 | Corresponding steps | | | S11→S12 (→S14) |
| | Modified phase combination | 90 | 0 | S143B *Less than the preset performance threshold value and greater than the performance indicator of the current phase; *Current phase combination is updated to be [90, 0]. S144 *There is still a reflecting unit without being adjusted. (Continue to perform S141) |
| 2 | Corresponding steps | | | S14: S141→S142→S143→S143B→S144 (→S141) |
| | Modified phase combination | 90 | 90 | S143B *Less than the preset performance threshold value and greater than the performance indicator of the current phase; |

TABLE 6-continued

Example of the third optimization result R3.

| Modifying times | Corresponding content | Reflecting unit 11a Phase | Reflecting unit 11b Phase | Evaluation Result |
|---|---|---|---|---|
| | | | | *Current phase combination is updated to be [90, 90]. S144 *All reflecting units have been adjusted. (Result R3) |
| | Corresponding steps | →S141→S142→S143→S143B→S144 (→R3) | | |
| | Third optimization result R3 | The current phase combination [90, 90] is taken as the current optimal phase combination. | | |

According to FIG. 4, Table 2 to Table 6 and the contents of the neighboring phase adjusting method provided by the present invention, in the neighboring phase adjusting method, limited neighboring phases are utilized to adjust/convert the phase of each reflecting unit 11, so that the numbers of phase modifying can be greatly reduced, the time spent in the overall phase optimization step can be shortened, and the overall optimization efficiency is improved. In addition, since the neighboring phase adjusting method is performed by simply applying the neighboring phases to form phase combination without complex algorithms involved, the complexity of related calculation can be reduced, and hence the corresponding hardware requirement is reduced (or the better operational performance can be obtained through the hardware of the same level). The cost of method execution or system establishment can be reduced, and the operational performance is improved.

In particular, in the neighboring phase adjusting method, if the modified phase combination is formed by an neighboring phase of the reflecting unit 11, and the performance indicator of the modified phase combination is less than the preset performance threshold value and greater than the performance indicator of the current phase combination, even if the reflecting unit 11 still has other neighboring phases which have not been formed the modified phase combination, the phase of the same reflecting unit 11 is not adjusted any more, and the phase optimization of the next reflecting unit 11 is performed. The mechanism is based on the fact that signal quality involves complicated factors, and the influence of the phase combination formed by the phases of the whole (multiple) reflecting units 11 on the signal quality is far superior to the optimal solution (such as an exhaustive method) of the phase of the single reflecting unit 11. Therefore, the phases of other reflecting units 11 can be quickly optimized through the modifying mechanism in the neighboring phase adjusting method so as to achieve the effect of accelerating the optimization of the signal quality.

More particularly, the neighboring phase adjusting method in the present invention is a method provided for the communication mechanism between the reconfigurable intelligence surface 1 and the user equipment 2. After an optimal communication state is established between the reconfigurable intelligence surface 1 and the user equipment 2, without considering failure or fault factors, one of the most significant factors influencing the communication (signal transmitting and receiving) between the reconfigurable intelligence surface 1 and the user equipment 2 is the changes of relative positions therebetween; wherein said change of relative position causes the corresponding signal quality degraded. As for the communication principle between the reconfigurable intelligence surface 1 and the user equipment 2, if the position of the user equipment 2 changes and the current phase combination is no longer the optimal solution, the phase of each reflecting unit 11 in the reconfigurable intelligence surface 1 can be correspondingly adjusted, and the modifying amount of the phase and the variation amount of the position of the user equipment 2 are in positive correlation. In other words, the optimal solution is always in the proximity range of the previous optimal solution, and it can also be understood as that the neighboring phase can be utilized to provide the range of the initial optimization solution so as to prevent from complicated calculations. Thus, the above principle can be converted into the neighboring phase adjusting method provided by the present invention, and said neighboring phase adjusting method comprises the following characteristics. The optimal phase modifying interval defined in said method can correspond to other neighboring phases of the initial phase combination (the current phase combination corresponding to the beginning of each optimization operation is defined as the initial phase combination, and the initial phase combinations in different optimization operations may be different or the same). Therefore, the mechanism provided by the neighboring phase adjusting method in the present invention can help to eliminate choices (with a larger phase difference with the initial phase) which are not likely to generate the optimal solution during the optimization process, and concurrently to make the quantity of preferable choices (each has a smaller phase difference with the initial phase, that is, the neighboring phase) which has high potential to become the best solution (which means that its performance index is not less than the preset performance threshold value) or optimal choice (which means that its performance index is not less than the performance index of the initial phase combination) reduce or limit in a certain range. Therefore, the number of calculations of iteration or trial during the optimization process can be reduced, and the overall operation speed can be further enhanced.

Figure 5:
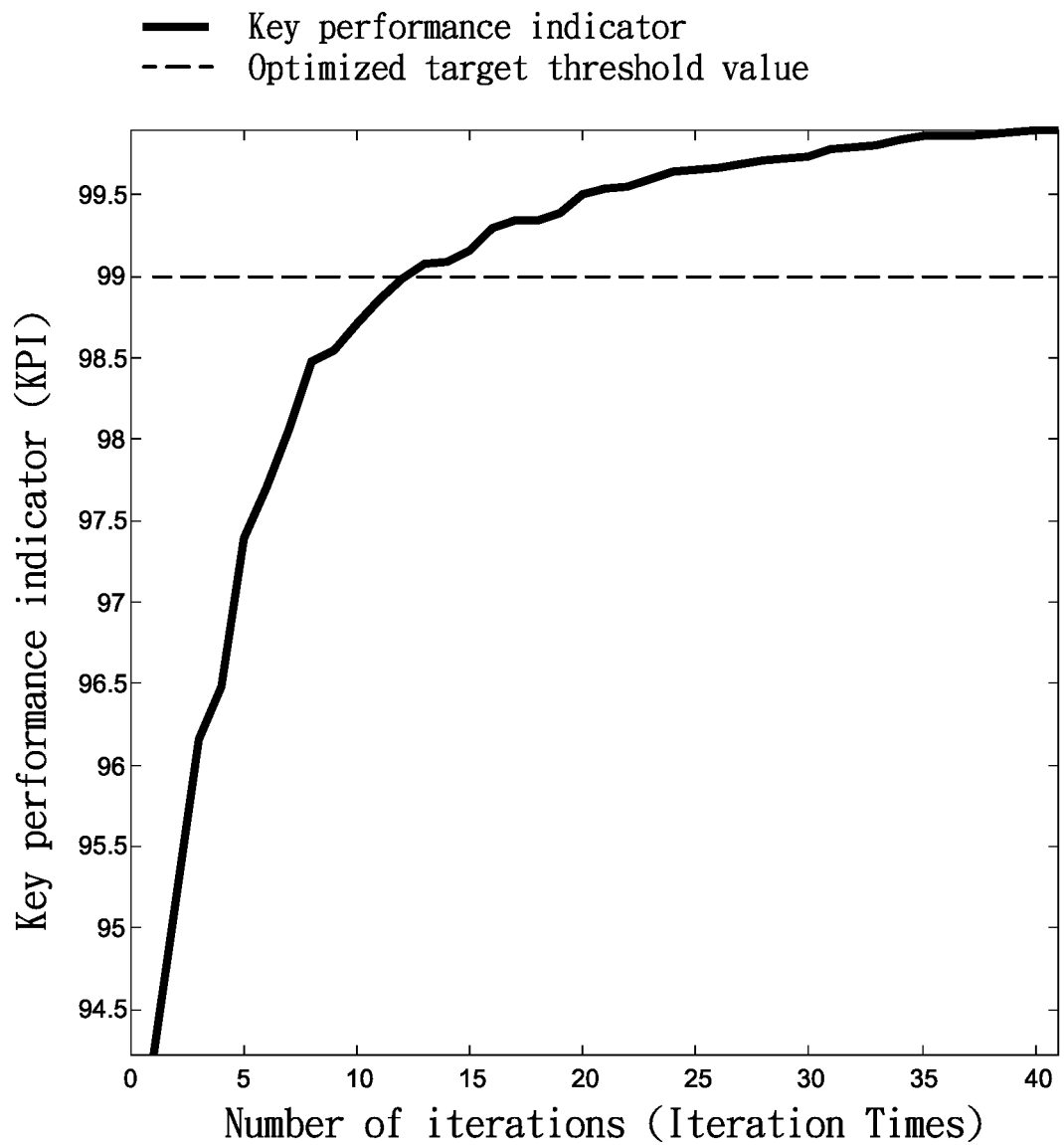
FIG. 5 is a schematic diagram showing the relationship between a key performance indicator and a number of optimizations of a neighboring phase optimization method according to the present invention.

According to said neighboring phase adjusting method, even if a best solution (which means that its performance index is not less than the preset performance threshold value) in the optimization process is not selected to be the neighboring phases, as more optimization times are performed, the signal quality tends to be optimized; wherein the detailed reason can be realized as the following. Based on the adjusted performance evaluating step S143 in the neighboring phase adjusting method and the first to third comparison patterns S143A-S143C, and based on a mechanism that the best solution is always in an adjacent range of the previous optimal solution, even if the best solution cannot be obtained in the early calculation processes, it is ensured to obtain the signal quality which is not inferior to the initial phase combination in each optimization process. Then, as the number of performing the optimization process is increased, the chance of obtaining best phase combination (corresponding to said best signal quality having a performance index not less than the preset performance threshold value) can be increased. Said mechanism and result are shown and can be proven in FIG. 5, the key performance indicators (KPI) obtained in each optimization process by the neighboring phase adjusting method are shown as the result of a progressive function.

In addition, based on the relationship between the reconfigurable intelligence surface 1 and the user equipment 2, especially after the optimized phase combination (which can be the real optimum phase combination or the current optimal phase combination) is obtained through the phase combination optimization process P1 preliminarily, the user equipment 2 does not generate an abnormally large deviation in position with the reconfigurable surface 1 substantially in the subsequent continuous monitoring process P2. Wherein, to avoid the problem of generating the abnormally large deviation in position, a proper distance threshold value or a specific difference value can be set especially during the continuous monitoring process P2 (where the variable distance condition or the performance indicator weakening condition are taken as conditions (corresponding to the restart optimization condition) for evaluating whether to restart the phase combination optimization process P1). Consequently, for an initial/original current phase combination, the to-be-adjusted desired/optimal phase (which means it has the best performance index) is ensured to be distributed in the neighboring phases of each phase in the initial/original current phase combination. Therefore, the neighboring phase method provided by the present invention is a modifying method for realizing the mechanism, and a more accurate and more efficient phase optimization result can be achieved.

Based on the above, the neighboring phase optimization method can be compared with a known random selection method (especially using the Random Max Sampling Algorithm) and a Conditional Sample Mean to obtain the results of Table 7 and Table 8. In particular, it should be noted that although the optimization process proposed by the present invention is illustrated by evaluating whether the performance indicator is "not less than" the preset performance threshold value; one having ordinary skill in the art can understand that replacing "not less than" with "not greater than", "greater than" or "less than" has equal significance and does not deviate from the spirit of the present invention under the consideration of preset performance threshold values and/or calculation for different evaluating properties. For example, if the bit error rate is used as the performance indicator, a proper evaluation condition is defined to reduce the error rate; at this situation, a corresponding determining logic term for the bit error rate evaluation condition is most like "less than" or "not greater than". Alternatively, if the determining logic is "not less than", the evaluating target can be simply convert "the bit error rate" to be "the reciprocal of the bit error rate" in the corresponding evaluation condition. That is, such variations of determining logic terms and/or evaluating targets are still not deviated from the spirit of the method provided by the present invention. The comparison results in the Table 7 and the Table 8 are constructed in the following test conditions: in a semi-open space with the length of 15 m and the width of 7.5 m, the bit error rate is used as the performance indicator to calculate that the performance threshold value is not greater than 0.01; and particularly. In the corresponding experiment result, 256 reflecting units 11 are provided, and each reflecting unit 11 has 4 phases.

TABLE 7

Comparison of coverage between neighboring phase optimization method and other conventional optimization methods.

| Input signal power | Quadrature amplitude modulation | Without optimization method | Random max sampling algorithm | Conditional sample mean | Neighboring phase optimization method |
|---|---|---|---|---|---|
| 3 dBm | 64 - QAM | 59.67% | 68.51% | 73.65% | 76.96% |
| 8 dBm | 256 - QAM | 32.59% | 43.95% | 57.49% | 62.85% |
| 13 dBm | 1024 - QAM | 11.72% | 34.29% | 45.29% | 52.07% |

It can be seen from Table 7, under the condition that the user equipment 2 is distributed arbitrarily and tested in three different environments (referring to three combinations of signal input power and quadrature amplitude modulation), the neighboring phase optimization method of the present invention has the maximum coverage compared with other optimization methods.

TABLE 8

Comparison of operation speed between neighboring phase optimization method and other conventional optimization methods.

| Input signal power | Quadrature amplitude modulation | Random max sampling algorithm | Conditional sample mean | Neighboring phase optimization method |
|---|---|---|---|---|
| 8 dBm | 256 - QAM | 20046 ms | 13.914 ms | 4.995 ms |
| 13 dBm | 1024 - QAM | Failed | 14.167 ms | 8.948 ms |

It can be seen from Table 8, the neighboring phase optimization method of the present invention can achieve the result that the bit error rate is not greater than 0.01 more quickly, and the operation speed is 60.1% higher than that of the conditional sample mean under the conditions that the signal input power is 8 dBm and the quadrature amplitude modulation is 256-QAM; and the operation speed is 36.8% higher than that of the conditional sample mean under the conditions that the signal input power is 13 dBm and the quadrature amplitude modulation is 1024-QAM.

Therefore, according to Table 7 and Table 8, the neighboring phase optimization method of the present invention has better performance in the aspect of operation speed and better coverage rate in the aspect of operation breadth, and hence has better adaptability to any environment.

In view of the foregoing, according to the method for signal optimization between the user equipment and the reconfigurable intelligence surface of the present invention, through the above phase combination optimization process, the relatively good phase combination and the relatively good performance indicator can be obtained by applying corresponding phase optimization steps under the simple coupling between the reconfigurable intelligence surface and the user equipment, and the complexity of phase combination optimization calculation can be reduced. Thus, the corresponding hardware requirement is reduced, or the better operational performance can be obtained through the hardware performance of the same level. The cost of method execution or system establishment can be reduced, and the operational performance is improved. In addition, through the restart optimization conditions in the continuous monitoring process, the quality of signals received by the user equipment can be optimized at proper time, and the effect of enabling the user equipment to maintain good signal quality can be achieved. In addition, through the neighboring phase adjusting method provided by the present invention, the modifying of the phase of each reflecting unit is limited to the neighboring phases in a certain range, where the neighboring phases have the significance of an optimization solution. Thus, complex operation can be avoided, so that the effect of improving the overall optimization performance and efficiency can be achieved.

Although the invention has been described in detail with reference to its presently preferable embodiments, it will be understood by one of ordinary skill in the art that various modifications can be made without departing from the spirit and the scope of the invention, as set forth in the appended claims. Further, if the above-mentioned several embodiments can be combined, the present invention includes any implementation aspects of combinations thereof.

What is claimed is:

1. A method for signal optimization between a user equipment and a reconfigurable intelligence surface (RIS), with the reconfigurable intelligence surface coupled with the user equipment through a plurality of reflecting units of the reconfigurable intelligence surface, with each of the plurality of reflecting units having a plurality of phases, and with the method having a preset performance threshold value; the method comprising:

a phase combination optimization process, comprising:
a current performance generation step: generating an RIS signal by the reconfigurable intelligence surface according to a current phase combination formed by a current phase of each reflecting unit, receiving the RIS signal by the user equipment, and generating a corresponding performance indicator by a performance evaluation module according to the RIS signal;

a current performance evaluating step: evaluating whether the performance indicator corresponding to the current phase combination is not less than the preset performance threshold value, and continuing to perform a real optimum phase combination determining step or a phase optimization step according to an evaluation result;

the real optimum phase combination determining step: reflecting the corresponding RIS signal by the reconfigurable intelligence surface through the current phase combination to form coupling with the user equipment in a state that the performance indicator is not less than the preset performance threshold value; and the phase optimization step:
generating at least one modified phase combination corresponding to an applied phase modifying method based on the current phase combination in a state that the performance indicator of the current phase combination is less than the preset performance threshold value, enabling the combination formed by the phase of each reflecting unit in the current phase combination to be different from the modified phase combination, and evaluating whether a performance indicator corresponding to the modified phase combination is not less than the preset performance threshold value;

defining the modified phase combination to be an optimized phase combination when the performance indicator corresponding to the modified phase combination is not less than the preset performance threshold value;

evaluating whether the performance indicator corresponding to the modified phase combination is greater than the corresponding performance indicator of the current phase combination when the performance indicator corresponding to the modified phase combination is less than the preset performance threshold value so as to determine an optimized phase combination;

and then replacing the optimized phase combination with the current phase combination to become an updated current phase combination;

wherein, by means of said phase optimization step, the performance indicator of the optimized phase combination is ensured not less than the preset performance threshold value or not inferior to the performance indicator of all of the at least one modified phase combination.

2. The method for signal optimization between the user equipment and the reconfigurable intelligence surface as claimed in claim 1, further comprising a continuous monitoring process following the phase combination optimization process; the continuous monitoring process including: a monitoring evaluating step of determining whether a restart optimization condition is met based on the current phase combination obtained after performing the phase combination optimization process each time; repeating the current performance evaluating step in a state that the restart optimization condition is met; and repeating the monitoring evaluating step in a state that the restart optimization condition is not met.

3. The method for signal optimization between the user equipment and the reconfigurable intelligence surface as claimed in claim 2, wherein in a state that the current performance evaluating step is repeated and the corresponding phase optimization step is performed, the phase modifying method adopted in the phase optimization step is a neighboring phase adjusting method;

according to the neighboring phase adjusting method, the at least one modified phase combination is formed by using a neighboring phase defined in an adjacent interval of a reference phase defined by a current phase of each of the reflecting units corresponding to the current phase combination, corresponding phase modifying is performed on only one of the reflecting units each time, and each time a new modified phase combination is formed, an evaluation is performed to check whether the performance indicator corresponding to the modified phase combination is not less than the preset performance threshold value and/or whether the performance indicator corresponding to the modified phase combination is greater than the performance indicator corresponding to the current phase;

wherein, if the modified phase combination formed by any of the neighboring phases is not less than the preset performance threshold or greater than the performance indicator corresponding to the current phase, the modified phase combination replaces the current phase combination to become the updated current phase combination; at this situation, for the current one reflecting unit, if there are other neighboring phases within said adjacent interval having not been formed modified phase combinations, no new modified phase combinations are formed according to the other neighboring phases;

wherein, if a performance indicator of the at least one modified phase combination is not less than the preset performance threshold, the phase optimization step is ended; otherwise if all performance indicators of the at least one modified phase combination are less than the preset performance threshold, the phase optimization step is ended.

4. The method for signal optimization between the user equipment and the reconfigurable intelligence surface as claimed in claim 2, wherein in a state that the current performance evaluating step is repeated and the corresponding phase optimization step is performed, the phase modifying method adopted in the phase optimization step is a neighboring phase adjusting method, and the neighboring phase adjusting method includes the following steps:

a to-be-adjusted reflecting unit determining step: determining a reflecting unit which has not been adjusted for the current phase combination in the same process of the phase combination optimization process as a to-be-adjusted reflecting unit;

a neighboring phase adjusting step: every time to generate a new modified phase combination, adjusting one phase of the to-be-adjusted reflecting unit to be one of at least one neighboring phase having not been formed a modified phase combination, wherein said at least one neighboring phase is defined within an adjacent interval of a reference phase of the to-be-adjusted reflecting unit; and an adjusted performance evaluating step: evaluating whether the performance indicator corresponding to the modified phase combination is not less than the preset performance threshold value and/or is greater than the performance indicator corresponding to the current phase combination, and providing the following three comparison patterns:

a first comparison pattern: replacing the current phase combination with the modified phase combination to form an updated current phase combination when the performance indicator of the modified phase combination is not less than the preset performance threshold value, and ending the phase optimization step;

a second comparison pattern: replacing the current phase combination with the modified phase combination to form an updated current phase combination when the performance indicator of the modified phase combination is less than the preset performance threshold value but greater than the performance indicator of the current phase combination; then, ending adjusting the phase of the to-be-adjusted reflecting unit, and continuing to perform an ending-modifying determining step; and a third comparison pattern: confirming whether each of the at least one neighboring phase corresponding to the to-be-adjusted reflecting unit has been formed the modified phase combination when the performance indicator of the modified phase combination is less than the preset performance threshold value and not greater than the performance indicator of the current phase; if there is any one of the at least one neighboring phase having not been formed a modified phase combination, repeating the neighboring phase adjusting step; if each of the at least one neighboring phase has been formed a respective one modified phase combination, continuing to perform the ending-modifying determining step;

wherein, the ending-modifying determining step includes: confirming whether there is any reflecting unit having not been adjusted in the same process of the phase combination optimization process; if there is any reflecting unit having not been adjusted, repeating the to-be-adjusted reflecting unit determining step; and if all reflecting units have been adjusted, ending the phase optimization step to obtain the current optimal phase combination.

5. The method for signal optimization between the user equipment and the reconfigurable intelligence surface as claimed in claim 2, wherein the restart optimization condition includes an accumulated time condition and/or a variable distance condition and/or a performance indicator weakening condition; the accumulated time condition is defined to determine whether an accumulated time for executing the current phase combination is not less than a time threshold value; the variable distance condition is defined to determine whether a moving distance of the user equipment is not less than a distance threshold value; and the performance indicator weakening condition is defined to determine whether the performance indicator of the current phase combination at present is reduced over a specific difference value compared with the performance indicator of the current phase combination itself at a previous timing to be determined as the optimized phase combination.

6. The method for signal optimization between the user equipment and the reconfigurable intelligence surface as claimed in claim 1, wherein the phase modifying method adopted in the phase optimization step is a neighboring phase adjusting method; according to the neighboring phase adjusting method, the at least one modified phase combination is formed by using a neighboring phase defined in an adjacent interval of a reference phase defined by a current phase of each of the reflecting units corresponding to the current phase combination, corresponding phase modifying is performed on only one of the reflecting units each time, and each time a new modified phase combination is formed, an evaluation is performed to check whether the performance indicator corresponding to the modified phase combination is not less than the preset performance threshold value and/or whether the performance indicator corresponding to the modified phase combination is greater than the performance indicator corresponding to the current phase;

wherein, if the modified phase combination formed by any of the neighboring phases is not less than the preset performance threshold or greater than the performance indicator corresponding to the current phase, the modified phase combination replaces the current phase combination to become the updated current phase combination; at this situation, for the current one reflecting unit, if there are other neighboring phases within said adjacent interval having not been formed modified phase combinations, no new modified phase combinations are formed according to the other neighboring phases;
wherein, if a performance indicator of the at least one modified phase combination is not less than the preset performance threshold, the phase optimization step is ended; otherwise if all performance indicators of the at least one modified phase combination are less than the preset performance threshold, the phase optimization step is ended.

7. The method for signal optimization between the user equipment and the reconfigurable intelligence surface as claimed in claim 6, wherein in the neighboring phase adjusting step, a phase in the at least one neighboring phase, having not been formed a modified phase combination and having a smaller phase difference relative to the reference phase, is determined to have a higher priority for forming a modified phase combination.

8. The method for signal optimization between the user equipment and the reconfigurable intelligence surface as claimed in claim 1, wherein the phase modifying method adopted in the phase optimization step is a neighboring phase adjusting method, and the neighboring phase adjusting method includes the following steps:
   a to-be-adjusted reflecting unit determining step: determining a reflecting unit which has not been adjusted for the current phase combination in the same process of the phase combination optimization process as a to-be-adjusted reflecting unit;
   a neighboring phase adjusting step: every time to generate a new modified phase combination, adjusting one phase of the to-be-adjusted reflecting unit to be one of at least one neighboring phase having not been formed a modified phase combination, wherein said at least one neighboring phase is defined within an adjacent interval of a reference phase of the to-be-adjusted reflecting unit; and
   an adjusted performance evaluating step: evaluating whether the performance indicator corresponding to the modified phase combination is not less than the preset performance threshold value and/or is greater than the performance indicator corresponding to the current phase combination, and providing the following three comparison patterns:
   a first comparison pattern: replacing the current phase combination with the modified phase combination to form an updated current phase combination when the performance indicator of the modified phase combination is not less than the preset performance threshold value, and ending the phase optimization step;
   a second comparison pattern: replacing the current phase combination with the modified phase combination to form an updated current phase combination when the performance indicator of the modified phase combination is less than the preset performance threshold value but greater than the performance indicator of the current phase combination; then, ending adjusting the phase of the to-be-adjusted reflecting unit, and continuing to perform an ending-modifying determining step; and
   a third comparison pattern: confirming whether each of the at least one neighboring phase corresponding to the to-be-adjusted reflecting unit has been formed the modified phase combination when the performance indicator of the modified phase combination is less than the preset performance threshold value and not greater than the performance indicator of the current phase; if there is any one of the at least one neighboring phase having not been formed a modified phase combination, repeating the neighboring phase adjusting step; if each of the at least one neighboring phase has been formed a respective one modified phase combination, continuing to perform the ending-modifying determining step;
   wherein, the ending-modifying determining step includes: confirming whether there is any reflecting unit having not been adjusted in the same process of the phase combination optimization process; if there is any reflecting unit having not been adjusted, repeating the to-be-adjusted reflecting unit determining step; and if all reflecting units have been adjusted, ending the phase optimization step to obtain the current optimal phase combination.

9. The method for signal optimization between the user equipment and the reconfigurable intelligence surface as claimed in claim 8, wherein in the neighboring phase adjusting step, a phase in the at least one neighboring phase, having not been formed a modified phase combination and having a smaller phase difference relative to the reference phase, is determined to have a higher priority for forming a modified phase combination.

10. The method for signal optimization between the user equipment and the reconfigurable intelligence surface as claimed in claim 1, wherein the preset performance threshold value is defined as a numerical value formed by adding a specific difference value to a performance indicator of an initial phase combination.

11. The method for signal optimization between the user equipment and the reconfigurable intelligence surface as claimed in claim 1, wherein the preset performance threshold value includes a first performance threshold value and a second performance threshold value; the first performance threshold value is defined as a constant, and the second performance threshold value is defined as a numerical value formed by adding a specific difference value to a performance indicator of an initial phase combination; and in the phase optimization step, when the performance indicator corresponding to the modified phase combination is not less than any one of the first performance threshold value and the second performance threshold value, a corresponding determination condition that the performance indicator corresponding to the modified phase combination is not less than the preset performance threshold value is met.

12. The method for signal optimization between the user equipment and the reconfigurable intelligence surface as claimed in claim 1, further comprising a decision control module; the decision control module is configured to receive the performance indicator generated by the user equipment corresponding to the current phase combination and/or the modified phase combination to perform a performance evaluation operation, generate an modifying instruction according to the phase modifying method, and transmit the modifying instruction to a controller of the reconfigurable intelligence surface; then the controller is configured to control the phase of the corresponding reflecting unit to be adjusted according to the modifying instruction so as to generate the modified phase combination in the phase modifying method; and the performance evaluation operation includes the steps of evaluating whether the performance indicator of the current phase combination is not less than the preset performance threshold value, and/or evaluating whether the performance indicator of the modified phase combination is not less than the preset performance threshold value and/or greater than the performance indicator of the current phase combination.

\* \* \* \* \*